United States Patent [19]

Kaire

[11] Patent Number: 4,639,551
[45] Date of Patent: Jan. 27, 1987

[54] REGULATED POWER SUPPLY CIRCUIT PARTICULARLY FOR TELEPHONE SET

[75] Inventor: Jean C. Kaire, Ste Egreve, France

[73] Assignee: Thomson-CSF, Paris, France

[21] Appl. No.: 629,992

[22] Filed: Jul. 12, 1984

[30] Foreign Application Priority Data

Jul. 22, 1983 [FR] France ................. 83 12173

[51] Int. Cl.[4] ........................................... H04M 19/00
[52] U.S. Cl. ..................... 323/231; 323/231;
323/275; 379/387; 379/413
[58] Field of Search ............ 323/231, 274, 275;
179/81 R, 70, 77, 16 A, 16 AA

[56] References Cited

U.S. PATENT DOCUMENTS 4,316,135  2/1982  Rall ............................ 323/265
4,390,829  6/1983  Jarrett ......................... 323/231

FOREIGN PATENT DOCUMENTS 0023714  2/1981  European Pat. Off. .
2052213  1/1981  United Kingdom .

Primary Examiner—James L. Dwyer
Attorney, Agent, or Firm—Roland Plottel

[57] ABSTRACT

The invention relates to power supply circuits, and in particular those used for directly supplying, from a telephone line, the bell or other items in a telephone set. In order to avoid unacceptable crosstalk or distortion due to saturation of the power supply circuit when the AC signal on the line drops below the value (Vs) of the regulated output voltage of the power supply, there is provision for detection of this saturation (56) and current shunting (T2, T3) that increases progressively with saturation, such that, seen from the line, the current consumption or impedance of the set remains constant despite the disturbances due to saturation.

3 Claims, 7 Drawing Figures

REGULATED POWER SUPPLY CIRCUIT PARTICULARLY FOR TELEPHONE SET

FIELD OF THE INVENTION

The present invention relates to DC power supply circuits which receive their energy from a line carrying AC voltage signals and which have a constant impedance.

It applies more particularly to subscriber telephone sets, which receive from the telephone line to which they are connected AC signals (ringing signal, or speech signal) from which they sometimes draw their energy (when ringing), this energy also being supplied by a DC signal in certain configurations (in speech).

DESCRIPTION OF THE PRIOR ART

As an example, the subscriber telephone set can include a DC voltage power supply circuit for the telephone bell. This circuit, in its simplest form, is represented in FIG. 1: it is connected by two input terminals A and B to the telephone line (not shown); it includes a decoupling capacitor 10, a rectifier bridge 12, a series impedance 14 and a voltage regulator device formed by a parallel configuration of a Zener diode 16 and a smoothing capacitor 18; the output voltage Vs of this power supply is taken from two output terminals C and D between which are placed the capacitor 18 and the Zener diode 16 in parallel.

In this example of FIG. 1, the impedance 14 has the function of matching the impedance of the telephone line.

The specifications of the telephone network can demand in particular that the impedance of the subscriber telephone set, seen from the line, is constant and does not introduce any signal distortion. Now, during the ringing phase, a large amplitude AC signal is applied to the input of the bridge rectifier. All goes well during times when the input voltage is, in absolute values, greater than the output voltage Vs (defined by the Zener diode): the impedance seen from the inputs A and B is substantially equal to the value of the impedance 14 and of the capacitor 10; but when the input voltage drops, in absolute values, below Vs, the rectifier bridge reverse-polarises (the diodes of the bridge all appear with reverse polarisation) and the impedance seen from the input suddenly becomes very high. A sudden discontinuity of impedance is therefore produced each half cycle of the input voltage, and this is not acceptable according to the specifications of the telephone network (this discontinuity of impedance results in a discontinuity in the current delivered by the line and in high and audible harmonic frequencies causing crosstalk in the whole of the network).

In another example, certain subscriber telephones can include a microprocessor, which must be supplied with a DC voltage of several volts, this also coming from the telephone line, but this time during the speech phase and not during the ringing phase. This voltage can be obtained from a power supply circuit of which a simplified diagram is represented in FIG. 2. This circuit includes input terminals E and F connected via a diode bridge to the telephone line (not shown), a diode 20 in series with a current source 22 between the terminals E and F, a PNP transistor 24 of which the emitter and the base are connected to the anode and the cathode respectively of the diode 20, and of which the collector is in series with a Zener diode 26 also connected to ground; a smoothing capacitor 28 is in parallel with the Zener diode 26 and with two output terminals G and H which provide a DC voltage Vs for supplying power to the microprocessor. The specifications demand that the current consumed by this power supply be constant, and it is the function of the current source 22 and the current mirror 20, 24 to impose this constancy. Here again, when the AC speech signal, present on the line and superimposed on a DC component present on the line, falls below the DC voltage Vs, transistor 24 becomes saturated and consequently there is a sudden discontinuity in the current in the line as in the AC impedance seen from the input of the power supply circuit.

These discontinuities result in a large and unacceptable distortion of the signals sent and received on the telephone line.

The solutions that have been proposed up to now consist in providing a switched impedance or switched current source in order to put an additional current source or impedance into operation from the moment that the input voltage drops below a reference value Vref that will be chosen slightly above the output voltage Vs; these solutions are represented in FIGS. 3 and 4: FIG. 3 corresponds with an improvement in the diagram of FIG. 1 and FIG. 4 corresponds with an improvement in the diagram of FIG. 2.

In FIG. 3 the following components have been added in relation to FIG. 1: two switches 30 and 32, an impedance 34 and a comparator (differential amplifier) 36 which controls the two switches in opposite phases.

As long as the output voltage Va of the bridge rectifier is higher than the reference voltage Vref (chosen slightly higher than the output voltage Vs of the circuit), switch 30 is closed and switch 32 is open, so that the circuit is the same as in FIG. 1; when the voltage Va drops below Vref, and even more when it drops below Vs, comparator 36 closes less switch 32 and opens switch 30, so that the impedance seen from the input of the circuit remains constant (the value of impedance 34 being chosen equal to that of impedance 14).

In the same way, as can be seen in FIG. 4, a switching of current sources can be provided when the input voltage Ve drops below a reference value Vref slightly higher than the output voltage Vs, so that, seen from the input of the circuit, the current consumed can remain constant without discontinuity when Ve drops below Vs.

In fact, these circuits of FIGS. 3 and 4 have two types of disadvantage:

on the one hand, the efficiency of the power supply is reduced, as bringing the additional impedance or the additional current source into operation forms a current path to ground, and therefore lost energy. The efficiency becomes lower as Vref becomes further from Vs, as the switching will occur more frequently; now it is necessary to keep a certain separation between Vref and Vs for the operation of the circuit to be certain;

on the other hand, at the time of switching, a certain distortion remains, particularly due to the overlap of the opening and closing times of switches, and to the imperfect pairing of the switched current sources and impedances.

SUMMARY OF THE INVENTION

To eliminate this disadvantage, the present invention proposes, in a power supply circuit including a voltage regulator configuration in series with a transistor controlled by a current regulator configuration, to detect the actual time at which saturation will occur in the current regulator configuration, saturation that is produced when the voltage on the line supplying energy approaches too close to the output voltage of the voltage regulator configuration, and to control, in accordance with this detection, the progressive bringing into operation of a current path in parallel with the series assembly of the transistor and the voltage regulator configuration.

More precisely, the circuit according to the invention includes an assembly of two additional transistors (second and third transistors) in series, in parallel with the assembly of the first transistor and the voltage regulator configuration, the second transistor being controlled like the first by the current regulator configuration, and the third being controlled by a means of detecting the saturation of the current regulator configuration.

Thus, a current is shunted out of the voltage regulator configuration when the input voltage of the circuit drops to a value that is too low, with respect to the output voltage of the voltage regulator configuration, for the current regulator configuration to continue to supply the voltage regulator configuration without discontinuity of current.

The current regulator configuration preferably includes an output stage formed by a fourth transistor, the collector of which is connected to the base of the first transistor in order to control it, and the means of detection of saturation is an antisaturation ring surrounding the collector of this fourth transistor, this ring providing a current for control of the third transistor that becomes larger as the saturation of the fourth transistor becomes greater.

BRIEF DESCRIPTION OF THE DRAWINGS

Other characteristics and advantages of the invention will become apparent on reading the detailed description which follows and which is given with reference to the appended drawings in which.

DESCRIPTION OF THE PREFERRED EMBODIMENTS

Figure 1:
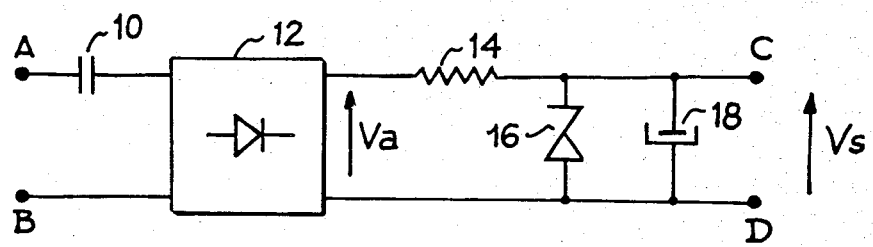
FIGS. 1 to 4 already described represent the prior art.
Figure 2:
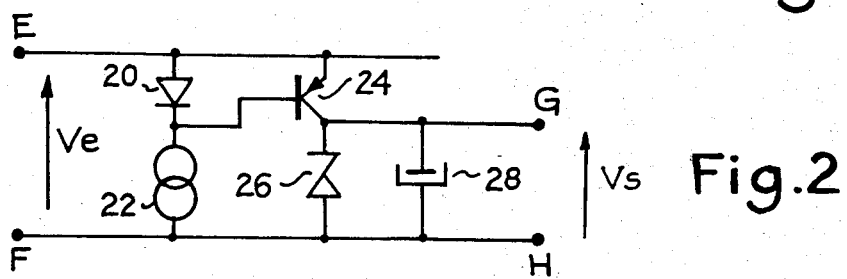
Figure 3:
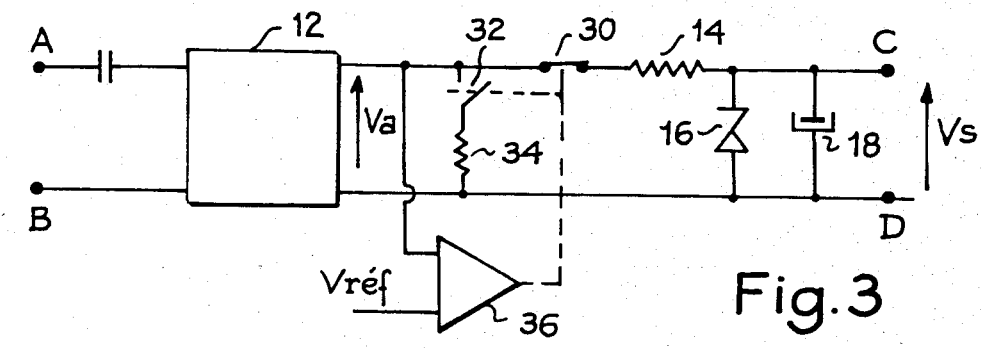
Figure 4:
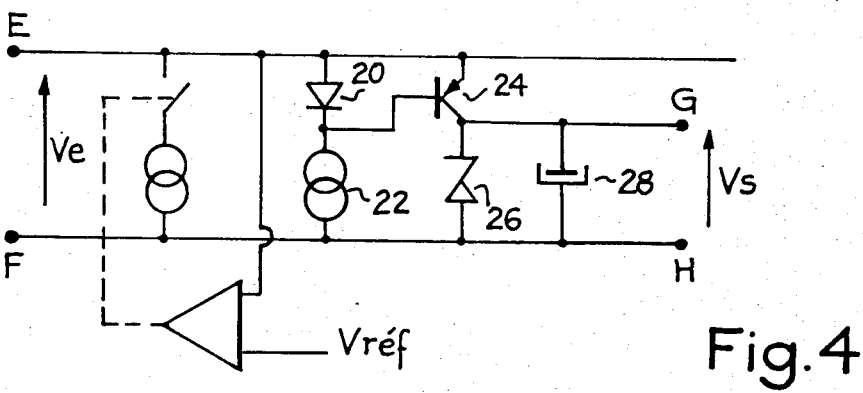
Figure 5:
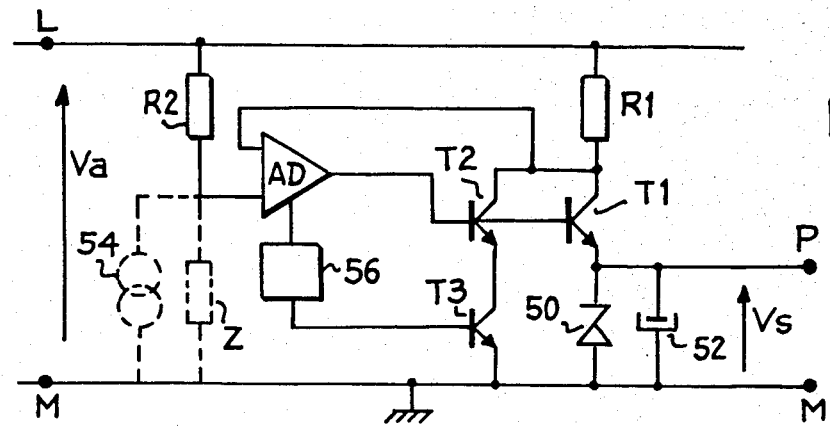
FIG. 5 represents a block diagram of a power supply circuit in accordance with the invention.

In FIG. 5, the diagram of the power supply circuit includes input terminals L and M (which can correspond with the output of the bridge rectifier of FIGS. 1 and 3 when it is a matter of supplying power to a telephone bell) or to terminals E and F of FIGS. 2 and 4, connected to the telephone line by means of a diode bridge, when it is a matter of the power supply circuit of a microprocessor for example). The voltage at these terminals is here called Va; it is a voltage that is a combination of an AC signal (ringing signal or speech signal) and possibly of a DC component (in speech mode); the output terminals are designated P and M, M being a ground terminal common to the less input and the output. The output voltage Vs between these terminals P and M is the regulated and smoothed voltage at the terminals of a voltage regulator configuration which can include a parallel assembly of a Zener diode 50 and a smoothing capacitor 52, as in FIGS. 1 to 4.

Between terminal L and this parallel assembly a series assembly of a resistor R1 and an NPN transistor T1 is provided.

The base of transistor T1 is controlled by the output of a differential amplifier AD of which one input is connected to the junction point of the resistor R1 and the collector of transistor T1, and of which the other input is connected to a resistor R2 also connected to terminal L. This second input of the differential amplifier is also connected to ground M via either an impedance Z or a current source 54; the impedance Z and the source 54 have been shown in dotted lines to indicate that one or other of them is used depending on the use of the power supply circuit; for supplying the telephone bell, an impedance can be provided, while for supplying a microprocessor a current source can be provided.

The differential amplifier AD, the impedance bridge R2, Z or the assembly R2, 54, and the resistor R1 form a current regulator configuration that controls the transistor T1 so as to maintain in the resistor R1, and therefore in the transistor T1 and in the voltage regulator configuration (50, 52), a well defined current, which is such that the voltage drop in resistor R1 is equal to the voltage drop in resistor R2. In fact, it is a genuine current regulator configuration when a current source 54 is connected to resistor R1; if it is an impedance Z that is connected, the current regulator configuration will also act as a regulator of the current in transistor T1, this time not to keep it constant, but rather to adjust it at all times in such a manner that, seen from the input of the power supply circuit, the impedance of this circuit appears constant.

However, with only the components that have just been described, the current regulator configuration will correctly fulfil its function only if the voltage Va on the line delivering energy is greater than the sum of the output voltage Vs, the normal voltage drop in resistor R1 and the voltage necessary to make transistor T1 conduct, failing which the transistor T1 or the transistor that controls it in the differential amplifier AD saturates and the current in resistor R1 drops to a value that is insufficient and that is no longer controlled by the current regulator configuration.

That is why a second NPN transistor T2 and a third NPN transistor T3 are provided here in series, the assembly being in parallel with the series assembly of the voltage regulator configuration and the transistor T1: the collectors of transistors T1 and T2 are connected together and the emitter of transistor T3 is at ground.

The base of transistor T2 is controlled by the output of the differential amplifier.

The base of transistor T3 is controlled by a saturation detecting component 56 which has the function of providing a control current that increases with the state of saturation of the current regulator configuration, and therefore with the state of saturation of transistor T1, or of the transistor controlling it in the amplifier AD.

This component 56 has been represented as being connected to the differential amplifier; in fact the detection of passing into the saturated state is preferably carried out at the level of the output stage of the differential amplifier AD which controls this transistor T1.

When a tendency to saturation occurs, transistor T3 becomes progressively conducting and, as transistor T2 is controlled by the same output as transistor T1, it progressively takes over from the latter in directing towards ground the current which should flow in R1 in order that the voltage drop in R1 remains permanently equal to the voltage drop in R2 despite the falling of Va below Vs.

This progressive transfer prevents any discontinuity in current or impedance and therefore reduces to a minimum the distortions that were previously there.

Figure 6:
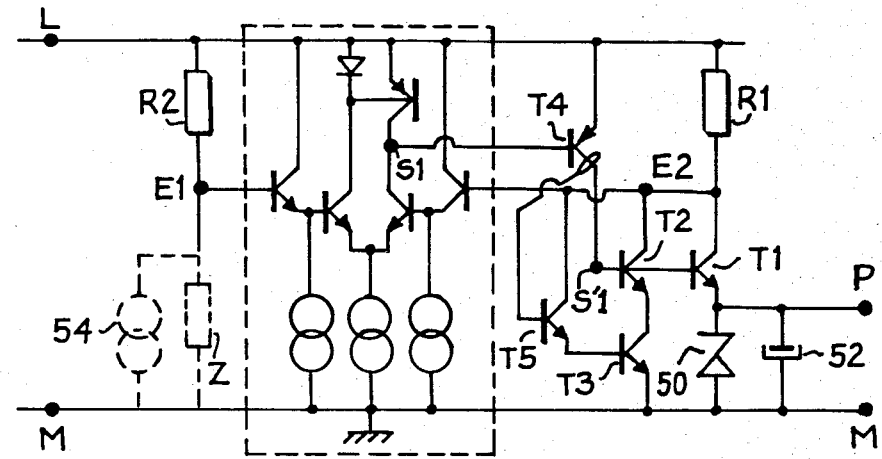
FIG. 6 represents a concrete detailed example of embodiment of a circuit according to the invention.

An example of detailed circuit production is represented in FIG. 6. In this figure, components L, M, P, R1, R2, 50, 52, 54, Z, T1, T2 and T3 are the same as in FIG. 5 and are connected in exactly the same way.

The differential amplifier AD includes a standard differential stage represented in a dotted box and an output stage formed by a PNP transistor T4 of which the base is controlled by the output S1 of the differential stage, of which the emitter is connected to terminal L and of which the collector forms the output S'1 of the amplifier AD, the output which directly controls the bases of transistors T1 and T2. It is this transistor T4 which tends to saturate first (before transistor T1).

The saturation detector 56 in FIG. 5 is formed by an antisaturation ring formed around the collector of the PNP output transistor T4, and by an NPN transistor T5 of which the base is connected to this antisaturation ring and of which the emitter is connected to the base of transistor T3 in order to control the conduction of the latter in accordance with the saturation of transistor T4. The collector of transistor T5 is connected to the junction point of resistor R1 and transistor T1.

The antisaturation ring is, in concrete terms, a semiconductor ring having the same type of conductivity as the collector and completely surrounding the latter, but separated from it by a narrow semiconductor region having the opposite type of conductivity, so that a parasitic transistor is formed between the collector and the antisaturation ring, a transistor which is biased on when the main transistor saturates, and which outputs from its collector a current that becomes higher as the saturation becomes higher; the antisaturation ring thus enables the saturation of transistor T4 to be easily detected. The lower part of FIG. 6 shows a configuration in discrete transistors that could replace transistor T4.

Transistor T5 amplifies this saturation detection current and uses it to control the base of transistor T3.

Figure 7:
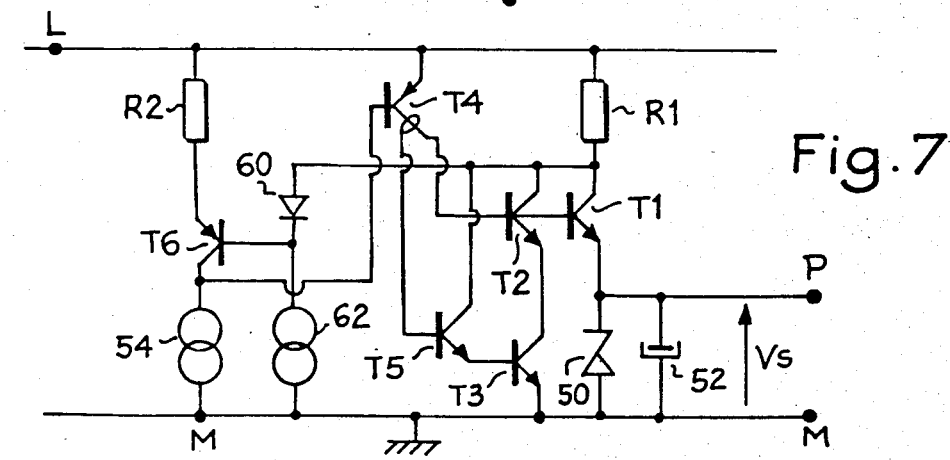
FIG. 7 represents another example of detailed embodiment.

FIG. 7 represents a variant of embodiment in which the following components are unchanged with respect to FIG. 6 as regards their type and their connections:
 voltage regulator configuration 50, 52,
 control transistor T1,
 resistor R1 defining a voltage drop produced in order to measure the fixed current in transistor T1,
 supplementary transistor T2 controlled at the same time as T1,
 transistor T3 establishing with T2 a current path to ground,
 transistor T4, PNP, forming the output stage of the current regulator configuration with, as a means of detecting the saturation of this configuration, an antisaturation ring around the collector of T4 and an amplifying transistor T5 that controls the base of transistor T3.

Only the current regulator configuration is modified (with the exception of its unchanged output stage T4): it includes a series assembly of a resistor R2, a PNP transistor T6 and a current source 54, between terminal L and terminal M.

The base of transistor T4 of the output stage is connected to the junction point of the collector of transistor T6 and the current source 54. Also, the junction point of resistor R1 and transistor T1 is connected by a diode 60 to the base of transistor T6 and this base is connected to ground by a current source 62.

Current sources 54 and 62 are preferably identical and cause identical voltage drops in the diode 60 and in the emitter-base junction of transistor T6, also produced from identical transistors.

The result of this is that the voltage drops in R1 and R2 must be identical, the current regulator configuration acting via transistor T4 on transistor T1 to draw a current such that the voltage drops remain identical. The current drawn is fixed and depends on the ratio between resistors R1 and R2.

When transistor T4 saturates, it is transistor T2 that passes the current necessary to maintain the imposed voltage drop in R1 without causing the output voltage Vs to drop. This shunting is possible because of transistor T3 which is made conducting by the antisaturation ring.

I claim:

1. DC voltage power supply circuit drawing its energy from a line carrying an AC signal, including a voltage regulator configuration (50, 52) in series with a transistor (T1) controlled by a current regulator configuration (AD, R1, R2, 54), characterised in that there is also provided an assembly of second and third transistors in series (T2, T3), in parallel with the series assembly of the first transistor (T1) and of the voltage regulator configuration (50, 52), the second transistor having its base controlled like the first by the current regulator configuration and the third having its base controlled by a means (56) of detecting the saturation of the current regulator configuration, so that a current is shunted out of the voltage regulator configuration when the input voltage of the circuit drops to a value that is too low, with respect to the output voltage of the voltage regulator configuration, for the current regulator configuration to continue to supply the voltage regulator configuration without discontinuity of current.

2. Circuit according to claim 1, characterised in that the current regulator configuration includes an output stage formed by a fourth transistor (T4) the collector of which is connected to the base of the first transistor and in that the saturation detector includes an antisaturation ring surrounding the collector of the fourth transistor.

3. Circuit according to claim 2, characterised in that the antisaturation ring is connected to the base of a fifth transistor (T5) of which the emitter controls the base of the third and of which the collector is connected to the collectors of the first and second transistors.

* * * * *